Figure 1:
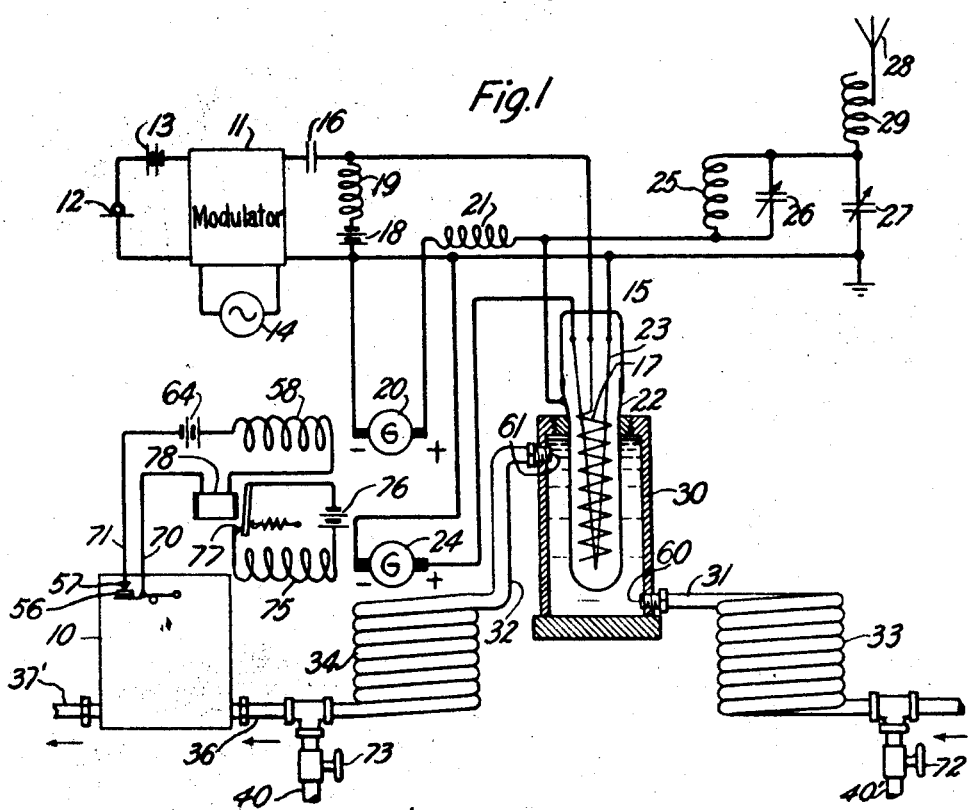

March 1, 1932.  J. O. GARGAN  1,847,086
FLUID OPERATED SWITCH
Filed June 9, 1925

Inventor:
John O. Gargan
by E. W. Adams, Atty.

Patented Mar. 1, 1932

1,847,086

UNITED STATES PATENT OFFICE

JOHN O. GARGAN, OF BROOKLYN, NEW YORK, ASSIGNOR TO BELL TELEPHONE LABORATORIES, INCORPORATED, OF NEW YORK, N. Y., A CORPORATION OF NEW YORK

FLUID OPERATED SWITCH

Application filed June 9, 1925. Serial No. 35,956.

This invention relates to control devices, and more particularly to means for controlling circuits or devices in accordance with the rate of flow of a liquid.

In systems for the transmission of large amounts of power by means of space discharge tubes, it is customary to provide tubes having special cooling means for dissipating heat energy generated in their electrodes, or other parts, by the space current, filament current, or other source. A common method of cooling is by producing a circulation of a cooling liquid, such as water, around the tube anode during the time that the power sources are operatively connected thereto.

Since high power tubes are expensive to construct and are easily destroyed by overheating, it is important to insure their protection against failure of the cooling water supply and to this end automatic control of the application of voltages to the tubes is desirable.

It is an object of the present invention to control mechanical devices or electric circuits in accordance with the rate or volume of flow of liquid.

Another object is to control circuits or devices in accordance with the difference in pressure along a fluid line.

A specific object is to control the current sources of space discharge devices in accordance with the quantity of a cooling medium applied to said devices.

An additional object is to indicate the rate of flow of a fluid stream.

A feature of the invention relates to a device including opposed pressure bellows connected to a cooling fluid line, the movement of which bellows is utilized for any desired purpose, for example, to operate a lever or other mechanical device or to control electric circuit switching means.

Another feature is a device, including elastic pressure bellows connected to different points in a fluid pipe line, which bellows operate by virtue of changes in the difference in pressure in the fluid, to actuate a lever or other mechanical device, or to open or close an electric circuit.

An additional feature is a graduated scale which may be calibrated to indicate the rate of flow or pressure difference between two points of the fluid stream.

The invention relates broadly to control systems wherein means is provided for translating the movement of a liquid or fluid medium into the movement of rigid bodies for the accomplishment of useful functions, such as the actuation of a lever or the control of the opening or closing of electric circuits.

More specifically, means is provided to control electric circuits in accordance with variations in the flow of water, or other cooling medium, through the cooling chamber of a space discharge device. A pressure difference is obtained by connection to different points in a fluid line, and this difference may be secured by means of a Venturi tube included in the pipe line feeding the cooling chamber. Separate pressure bellows capable of extensile and contractile movement are operably joined to separate points in the fluid line, such as points on a Venturi tube, for example, and their degree of expansion or contraction is determined by the difference in pressure produced by the water flowing between the points mentioned. A lever or other device may be attached to the bellows and may be movable under their conjoint action to perform various functions, such as to cause the operation of a circuit opening and closing switch. The system is adjusted and designed so that when the flow of water falls below any predetermined volume, for example, one gallon per minute, or the difference in pressure on the two bellows falls below a given value, such, for example, as eight pounds per square inch, the sources of power for the space discharge tube are disconnected or rendered inoperative. The electrodes of the space discharge tube are thus prevented from becoming overheated by a failure of the cooling water supply.

An important advantage gained by the invention herein disclosed is that by use of pressure bellows for actuating movable devices the necessity of providing pistons or other devices requiring movement through watertight or packed bearings is avoided. The leakage, corrosion, and attendant variation in operating conditions with the resultant necessity for supervision and adjustment of the apparatus is eliminated.

In the drawings, Fig. 1 illustrates the arrangement of a radio transmitting circuit including a water cooled space discharge tube and a device for controlling the power sources of the tube in accordance with this invention.

Figure 2:
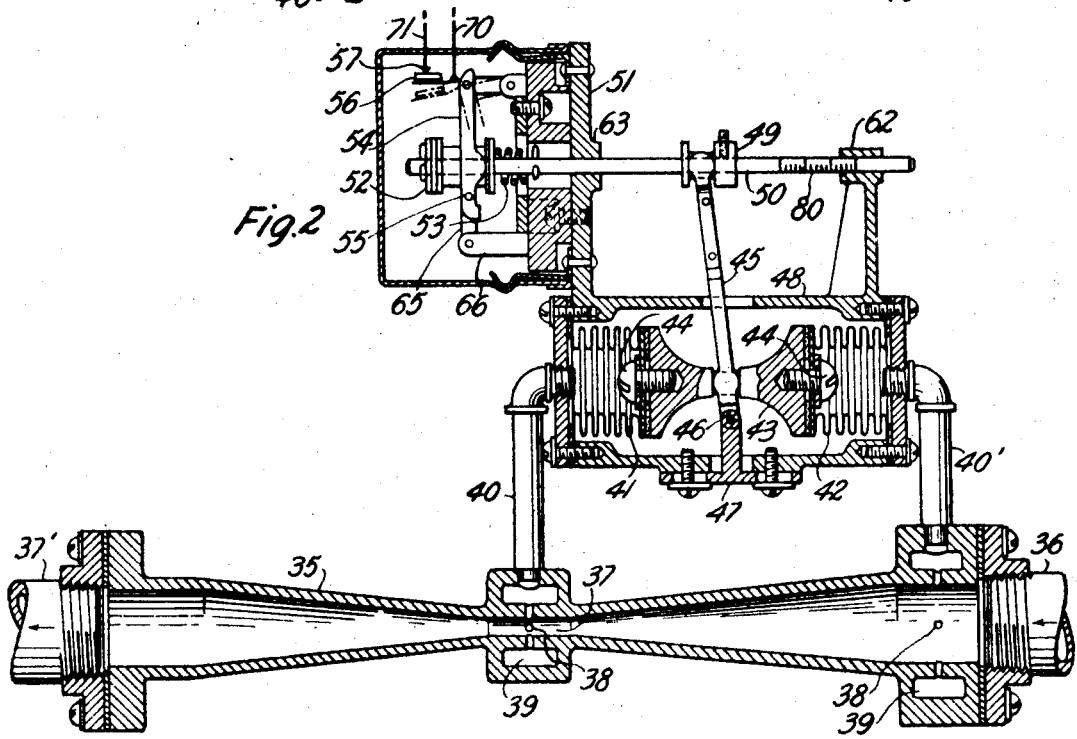

Fig. 2 is a cross-sectional view of the control mechanism represented by block 10 in Fig. 1.

In the drawings like reference characters indicate like parts.

The following is a description of the transmitting circuit shown in Fig. 1. This circuit includes a modulating device preferably of the space discharge tube type represented by block 11, which may be arranged in any of the many well known forms, such, for example, as described in Patent 1,442,146 issued January 16, 1923 to R. A. Heising. This modulator has connected thereto a source of signal waves illustrated as a microphone transmitter 12 in series with a battery 13.

If required, a separate source of carrier waves 14 to be modulated in accordance with signals may be provided.

The modulator 11 is coupled to the control electrode circuit of a high power amplifying tube 15 by a condenser 16. A suitable average potential is applied to the control electrode 17 of tube 15 by a polarizing battery 18 in series with a high frequency choke coil 19. The choke coil 19 prevents the passage of modulated waves through the battery 18.

Space current for tube 15 is supplied by a direct current generator 20 in series with a choke coil 21, connected between the anode 22 and cathode 23 of tube 15. The generator 20 includes a field winding 58 supplied with current by a suitable source of current, represented as a battery 64, in series with relay 78 and contact 56, 57 of the switch shown in Fig. 2.

Heating current may be supplied to the cathode 23 in any well known manner, for example, as illustrated by a direct current generator 24. Generator 24 has a field winding 75 included in series with a source of current, viz battery 76, and contacts 77 of the relay 78 in the field circuit of generator 20.

A high frequency output circuit for tube 15 is connected to its anode and cathode and includes a resonant circuit having an inductance 25 in shunt to an adjustable condenser 26 in series with a coupling condenser 27.

Energy is supplied from the output circuit to the antenna 28 by the coupling condenser 27, which is connected thereto in series with adjustable inductance 29. The opposite terminal of condenser 27 is connected to ground.

The anode 22 of space discharge tube 15 is included within a water-tight chamber formed by a casing 30 having an inlet port 60, connected to a water supply pipe 31, and an outlet port 61 connected by another pipe 32 to the device represented by block 10 which is illustrated in detail in Fig. 2.

Water is supplied from any desired source, for example, a motor driven pump to the pipe 31 and a flow of water is accordingly maintained around the anode 22 to maintain it at a proper operating temperature. This water circulates through the coils 33 and 34, respectively. These coils, which are preferably of insulating material, for example, rubber hose, provide a column of water of sufficient length between the anode 22 and the metallic portions of the water supply apparatus to provide a proper degree of insulation therebetween.

The apparatus shown in Fig. 2 includes a Venturi tube 35 having the inlet end 36, which is coupled to the outlet end of pipe 32, and the outlet end 37', which is connected by a pipe (not shown) to a water cooling radiator and thence to the return chamber of the water pump.

The Venturi tube includes a restricted throat portion 37 having a vent 38 leading to a circular chamber 39. The chamber 39 has an outlet connected by pipe 40 to a flexible metal bellows 41. The inlet end of the Venturi tube 35 has a similar vent 38 and chamber 39 connected by a pipe 40' with metal bellows 42.

The bellows 41 and 42 are each closed at their adjacent ends and are attached to an abutment or yoke 43 by means of screws 44. A lever 45, which is pivoted at the point 46 to a support 47, which is attached to a cylindrical casing 48, is pivotally attached to the yoke 43. The load end of lever 45 engages a lug 49 attached to a rod 50 transversely movable in bearings 62 and 63 which are integral with the casing 48. The rod 50 has an end extending through bearing 63 and this end of rod 50 carries a bobbin 52 and between the bobbin and the bearing 63 a coil spring 53.

In the normal position of rod 50 the bobbin 52 is pressed against the lever arm 54, which is connected by a flexible joint 55 to one end of a link 65 whose opposite end is pivoted to a projecting support 66. The opposite end of lever arm 54 is attached to a conductive switch arm 56 and maintains it normally in contact with a member 57 so as to close the circuit of the field winding 58 of generator 20 (see Fig. 1).

In the operation of the invention signal waves from source 12 and carrier waves from source 14 are combined in modulator 11 to produce signal modulated carrier waves which are supplied to the input circuit of tube 15, including its control electrode and cathode. These waves are normally amplified by tube 15 and transmitted through resonant circuit 25, 26 and coupling condenser 27 to the antenna 28.

The generator 20 applies a high voltage to the anode and cathode of tube 15 and generator 24 supplies large current to the cathode 23. During operation of this tube cooling water is supplied to the chamber 30 in order to keep the tube including its electrodes, particularly the anode 22, from overheating.

While the normal flow of water is maintained in the chamber 30 different pressures are produced at the inlet and throat-connections, respectively, of the Venturi tube 35. The normal difference of pressure causes the elastic bellows 41 and 42 to assume a position such that switch armature 56 is held in contact with element 57 by bobbin 52 and rod 50. During the time contact 56, 57 is closed the field winding of generator 20 is supplied with current by source 64 and the generator supplies space current to the tube 15. Likewise during this time relay 78 maintains the field circuit of generator 24 closed by its contacts 77 and generator 24 heats the filament 23 to a suitable electron emitting temperature.

In the event that the circulation of water in the chamber 30 falls below a fixed value, or is stopped, the pressure difference between the throat and inlet of Venturi tube 35 diminishes, and the bellows 41 and 42 cause lever 45 to move rod 50 so as to cause bobbin 52 to break the joint 55 and open switch contact 56, 57. The field circuit of the generator is accordingly opened, relay 78 deenergized, and the generator ceases to supply space current to tube 15. The field circuit of generator 24 is opened upon the release of relay 78, and this generator ceases to supply heating current to the filament 23.

The bobbin 52 allows a certain margin of movement of rod 50 before the switch is opened. This allows slight variations of the flow of cooling water to take place without interrupting the operation of the transmitter.

If desired the Venturi tube may be dispensed with and the bellows 41 and 42 connected to separate points in the cooling line to utilize the inherent drop in pressure therein. For this purpose a T joint on the inlet pipe connected to coil 33 has a valve 72 and an inlet pipe which may be the pipe 40' of Fig. 2. Also the outlet pipe connected to coil 34 has a similar joint and valve 73 adapted to be connected to pipe 40 of Fig. 2. When the device is so connected the arrangement represented by block 10 is omitted. The leads 70 and 71 instead of leading to the arrangement in block 10 would connect to leads 70 and 71 of Fig. 2 as before.

The drop in pressure along coils 33 and 34, pipes 31 and 32 and in chamber 30 is sufficient to operate the pressure bellows and switch in the manner set forth.

As a means of giving a visible indication of the volume of flow in the water line the rod 50 is provided with graduations to form a scale 80, the inner edge of bearing 62 may serve as a pointer for indicating the particular scale reading at any position of the rod. The scale may be graduated in gallons per minute or any other suitable units.

Although the invention has been described in connection with a radio transmitting system it is only to be limited as indicated by the scope of the appended claim.

What is claimed is:

In combination, a fluid conduit, a frame member, a metallic bellows having one end rigidly attached to said frame member, an auxiliary conduit connecting said bellows to one point in said conduit, a second metallic bellows having one end rigidly attached to said frame member to such a position that its free end is opposed to the free end of the first bellows, a second auxiliary conduit connecting said second bellows to another point in said fluid conduit, a lever arm pivoted at its intermediate point on said frame member, a yoke member attached to both of said bellows for transferring differential motions thereof to said lever arm, a rod means for transferring motions of said lever arm to said rod, an articulated lever system, an electrical contact arm carried by said lever system, an electrical contact cooperating with said electrical contact arm, and means operated by the movement of said rod in one direction for extending said lever system to close the electrical contact and by a predetermined movement in the opposite direction to collapse said lever system and open the electrical contact.

In witness whereof, I hereunto subscribe my name this 3d day of June A. D. 1925.

JOHN O. GARGAN.